T. C. FOWLER.
WIRE STRAINER.
APPLICATION FILED APR. 7, 1920.

1,362,688.

Patented Dec. 21, 1920.

Inventor
T. C. Fowler
By H. R. Kenlake
Attorney

UNITED STATES PATENT OFFICE.

THOMAS CHARLES FOWLER, OF AUCKLAND, NEW ZEALAND.

WIRE-STRAINER.

1,362,688.  Specification of Letters Patent.  Patented Dec. 21, 1920.

Application filed April 7, 1920. Serial No. 372,013.

*To all whom it may concern:*

Be it known that I, THOMAS CHARLES FOWLER, of the city of Auckland, (and whose post-office address is Brunswich Buildings, Queen street, Auckland, in the Provincial District of Auckland, in the Dominion of New Zealand,) have invented certain new and useful Improvements in Wire-Strainers, of which the following is a specification.

This invention relates to means employed for straining wires and uniting the ends of same.

The object of the invention is to provide a simple and convenient device, whereby fencing wires, the wires around boxes, bales and the like, can be strained to the required tension and the ends thereof secured together with little trouble.

According to the invention the device comprises a frame in two portions, each of which carries a roller, and is slotted to engage a wire.

The ends of the two portions of the frame overlap when fitted together, and are forked so that the ends of each portion pass upon the spindle of the other portion.

A spring plate with holes therein and secured on one of the portions of the frame, is adapted to pass over the ends of the roller spindles when the two portions of the frame are fitted together, for the purpose of retaining the latter in such a position until such time as they require to be taken apart.

Each roller has a toothed wheel at one end, said wheels meshing with each other when the two portions of the frame are properly united.

One of the roller spindles is shaped to take a handle and a spring pawl is provided on one of the portions to engage one of the toothed wheels and so prevent the rollers from turning in the wrong direction when straining, under the strain of the wires.

Each roller has one or more holes through its diameter to take the ends of the wires.

The device and the manner of using same will now be described in detail with the aid of the accompanying drawing:—

Figure 1:
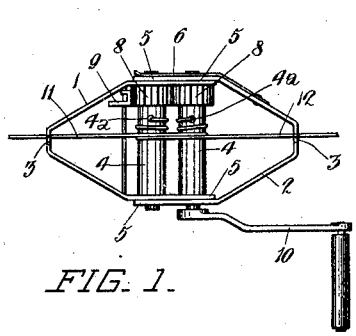

Figure 1 being a plan view illustrating the drawing together of two lengths of wire, while Figs. 2 to 5 show the successive operations in uniting and securing the ends of the wires.

Figure 6:
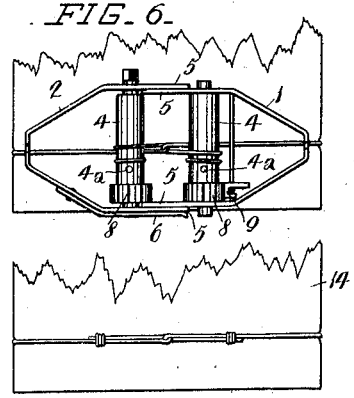
Figure 7:
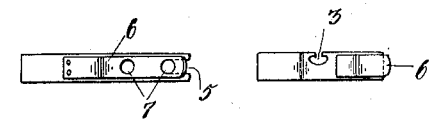
Figure 8:
Figure 9:

Figs. 6 and 7 show how the device is employed in straining and securing a wire around a bale, box or the like, and Figs. 8 and 9 are a side and an end view respectively of one portion of the frame.

The frame consists of two separate portions 1, 2, each of which has a slot cut therein at 3 and carries a roller 4, with holes 4ª formed diametrically through same.

The ends of the portions 1, 2 are forked at 5 (as in Fig. 8), so that when the frame is put together the forks 5 of each portion pass upon the spindle of the roller 4 of the other portion.

A spring plate 6 on the portion 2 contains holes 7 which pass upon the ends of the roller spindles when the portions 1, 2 are fitted together, so as to keep the latter united until such time as it is necessary to take them apart.

Each roller spindle has mounted thereon a toothed wheel 8, said wheels meshing with each other when the portions 1, 2 are properly put together.

A spring pawl 9 on the portion 1 engages the wheel 8 thereon and prevents both the latter and the rollers 4 from rotating in the wrong direction when straining the wires.

A handle 10 is fitted on one of the roller spindle ends shaped to take same.

In straining and joining two wires or the ends of a single wire, the device is used as follows:—

The two portions 1 and 2 of the frame are first fitted together as shown in Fig. 1. The wire ends 11 and 12 to be united are entered one in each of the slots at 3 and each wire is led to the farthest away roller 4 and passed through a hole 4ª in same.

The handle 10 is then rotated to cause the rollers 4 to take the slack off and strain the wire or wires to the required tension, the pawl 9 preventing any slacking of the wire or wires, when the turning of the handle ceases.

Figure 2:
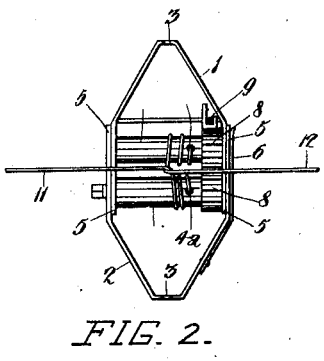
Figure 3:
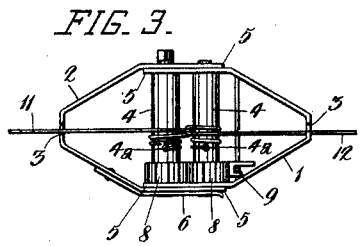

By disengaging the wire ends 11, 12 from the slots at 3, the whole device can be twisted horizontally in the direction indicated in Figs. 1 and 2 to cause said ends to become looped together as shown in Fig. 3.

The next step is to take the portions 1 and 2 apart and this is done after the plate 6 has been sprung back to clear the roller spindle ends.

Figure 4:
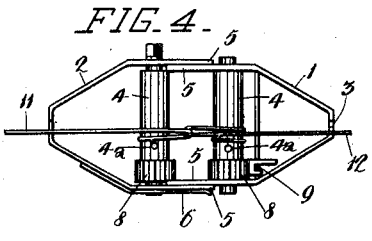

The portions 1, 2 are then drawn apart in the manner indicated in Fig. 4, the operation being permitted by the rollers 4 unwinding, while the strain on the wire or wires is maintained by the looped connection between same.

Figure 5:
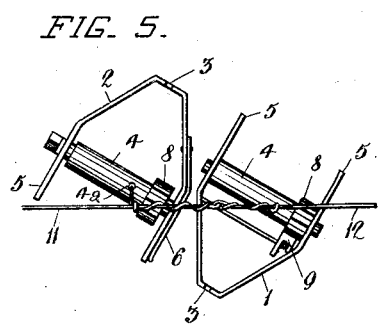

When the portions 1, 2 are far enough apart to clear one another, each is twisted vertically as illustrated in Fig. 5, to cause the shorter legs of the loops to wind tightly around the longer legs of the latter, after which the rollers 4 are disengaged from the wire ends.

A wire around a case or bale 14 (Figs. 6 and 7) is first strained to the required tension, after which the device is twisted to loop the wire ends together in a manner similar to that before described, but instead of twisting the portions 1, 2 vertically, as shown in Fig. 5, they are simply drawn apart a distance sufficient to enable the looped ends to be secured by staples, or binding 15 as shown in Fig. 7.

What I do claim and desire to secure by Letters Patent of the United States is:—

1. A device for the purpose set forth including a frame formed of two independent similar portions detachably connected together, a wire straining roller mounted in each of said portions, a gear mounted on one of said rollers, another gear mounted on the other roller and meshing with the first named gear when the two portions are connected together, and means for rotating one of said rollers whereby the gear of that roller causes rotation of the other roller in an opposite direction.

2. A device for the purpose set forth, comprising a frame in two portions each of which carries a roller with holes therein, and is formed with ends which pass upon the spindle of the roller of the other portion; toothed wheels on said roller spindles meshing with each other when the frame is put together; a pawl engaging one of said wheels, and a handle fitting on one of the roller spindles, substantially as described and illustrated.

3. A device for the purpose set forth, comprising a frame in two portions, each of which has mounted therein a roller parallel with the roller mounted in the other portion, and formed with forked ends to pass upon the roller spindle of the other portion; toothed wheels on said roller spindles meshing with each other when the frame is put together; a spring pawl on one of said portions engaging the toothed wheel on the roller spindle of the same portion and a handle fitting on one of the roller spindles, substantially as described and illustrated.

4. A device for the purpose set forth comprising a frame in two portions each slotted to engage a wire and carrying a roller with holes therein, and formed with forked ends to pass upon the roller spindle of the other portion; a spring plate with openings therein secured on one of said portions and fitting over the spindle ends when the frame is put together; toothed wheels on said spindles adapted to mesh with each other; a spring pawl engaging one of said wheels and a handle fitting on one of said spindles, substantially as described and illustrated.

In testimony whereof I affix my signature in the presence of two witnesses.

THOMAS CHARLES FOWLER.

Witnesses:
  WILLIAM PINCUES,
  ELSA GREENE.